United States Patent
Mangin et al.

(10) Patent No.: US 7,453,799 B2
(45) Date of Patent: Nov. 18, 2008

(54) METHOD AND DEVICE FOR A DYNAMIC ARQ WINDOW MANAGEMENT

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 569 days.

(21) Appl. No.: 11/062,802

(22) Filed: Feb. 23, 2005

(65) Prior Publication Data

US 2005/0190698 A1 Sep. 1, 2005

(30) Foreign Application Priority Data

Feb. 27, 2004 (EP) .................... 04290541

(51) Int. Cl.
*H04L 1/00* (2006.01)
*H04L 12/28* (2006.01)
*H04J 3/16* (2006.01)

(52) U.S. Cl. ............... 370/229; 370/395.4; 370/468
(58) Field of Classification Search ............. 370/236, 370/235, 428, 412–418, 335, 342; 714/746–750
See application file for complete search history.

(56) References Cited

U.S. PATENT DOCUMENTS 6,021,124 A * 2/2000 Haartsen .................... 370/336
6,496,481 B1 12/2002 Wu et al.
2003/0110435 A1 6/2003 Wu et al.

FOREIGN PATENT DOCUMENTS

EP 1 261 162 11/2002

* cited by examiner

*Primary Examiner*—Chirag G Shah
*Assistant Examiner*—Srinivasa R Reddivalam
(74) *Attorney, Agent, or Firm*—Oblon, Spivak, McClelland, Maier & Neustadt, P.C.

(57) ABSTRACT

There is disclosed a method and a device of method of dynamic ARQ windows management in a network for controlling data link transmission. The method comprises an ARQ management entity selecting a given operational control mode, and a transmitter sending one or more PDUs of a given data link to a receiver. The receiver stores received PDUs in a shared memory. A receiver ARQ instance sends back corresponding ARQ-ACK message including a specific information comprising selected operational control mode and/or a flow control data. It further removes acknowledged PDUs from the shared memory when delivering them to an upper layer. The transmitter ARQ instance continues or stops PDUs transmission upon reception of the ARQ-ACK message, based on the specific information comprised therein. The step of selecting the operational control mode is repeated dynamically on a per data link basis during PDUs transmission, while taking into account the available memory space within the shared memory, the respective associated QoS priority, as well as the sliding window memory requests received from the transmitters by the receiver.

14 Claims, 2 Drawing Sheets

METHOD AND DEVICE FOR A DYNAMIC ARQ WINDOW MANAGEMENT

BACKGROUND OF THE INVENTION

1. Technical Field

The present invention relates generally to communication networks, and more particularly to an ARQ windows management in a network based on an ARQ protocol.

2. Related Art

A communication network comprising several stations (STA) and nodes is considered herein. The data generated by the applications running on the STAs are exchanged over data links in respective data flows. Each data flow corresponds to a given transmitter, a given receiver and a given application. One or more data flows can be transported over a given data link. A data link is established from one transmitter STA to a receiver STA, passing through intermediate nodes or not. Referring to a network protocol layering model according to the ISO ("International Standardization Organization"), the data link is ruled by a Link Layer (LL) protocol, which includes a Medium Access Control sub-layer (MAC). At the LL level, the data are transported in LL Protocol Data Units (LL-PDUs) which are inserted in, or extracted from, the physical medium by the MAC sub-layer. In the following, a transmitter STA and a receiver STA will be respectively referred to as a transmitter and a receiver.

In case of an error prone physical medium (e.g. radio, power line, etc . . . ), the LL layer includes an Error Control (EC) mechanism that is in charge of recovering the transmission errors experienced by the LL-PDUs. EC mechanisms are usually based on repetition of the lost or corrupted LL-PDUs as detected by the receiver. Protocols managing such repetitions schemes are also known as Automatic Repeat reQuest (ARQ) protocols. Generally, an ARQ instance is running both on the receiver and on the transmitter. A reverse data link is then provisioned so that the ARQ instance of the receiver can inform the ARQ instance of the transmitter about the reception status of the transmitted LL-PDUs. This ARQ protocol information is transported in specific signalling LL-PDUs also referred to as ARQ feedback messages or ARQ ACKnowledgement (ARQ-ACK) messages. In this type of protocols, the transmitter can send data to the receiver over a given data link only if an ARQ-ACK message relative to the previously sent LL-PDU has been correctly received. Consequently, when the transmitter is waiting for an ARQ-ACK message, the data transmission is blocked until the reception of the ARQ-ACK message. This blocking in a data transmission impacts the data link and then the transmission efficiency. In order to improve transmission efficiency by avoiding transmission blocking, a sliding window mechanism is generally introduced. The sliding window represents the number of LL-PDUs the transmitter can transmit without having received an ARQ-ACK message. The size of such a sliding window is defined by two boundaries, generally referred to as Bottom of Window (BoW) and Top of Window (ToW). Depending on the protocol, the size of the sliding window can be fixed, as for example with the HiperLAN/2 standard defined by the European Telecommunication Standard Institute (ETSI), or variable as for example with the Transmission Control Protocol (TCP). If the size of the sliding window is fixed, it is chosen at the time of the establishment of the data link. If the size of the sliding window is variable, it is advertised to the transmitter through the ARQ-ACK messages sent by the receiver. In this latter case, the reception of an ARQ-ACK updates the sliding window boundaries. During the data transmission, the transmitter controls the data flows over the corresponding data link based on these boundaries. Stated otherwise, the transmitter stops, resumes or continues LL-PDUs transmission by controlling the number of LL-PDUs sent without reception of ARQ-ACK. It results therefrom that the sliding window has a flow control effect that can disadvantageously affect the data link throughput even when no error occurs.

ARQ protocols rely on the identification of the PDUs that is common to the transmitter and the receiver and used by the protocol signalling so that the receiver can indicate in an ARQ-ACK message sent to the transmitter which PDUs are not correctly received. The data unit identification is typically a sequence number specific to the data units handled by the considered layer only.

On the other hand, the applications running on the STAs can have various Quality of Service (QoS) requirements. For example, these QoS requirements can be expressed in terms of bit rate (or bandwidth) or transmission delay constraints. The fulfilment of these constraints is possible if the data link offers the required bandwidth and/or transmission delay. In particular, bandwidth provisioning can be performed through resource reservation procedures. If successful, the resource reservation guaranties that the application data flow will be transported with the required bit rate. In the following section, for the sake of better understanding, only the bit rate QoS requirement is considered.

A single data link can be used to transport several application data flows with similar QoS requirements. Thus, the bit rate of a data link can vary in time, depending on the activity of the different application data flows.

This section exposes the basic principles and definitions for such ARQ protocols. As it has already been described, a sliding window is defined by its two boundaries and its size: respectively ToW, BoW and Window Size (WS). In the following, they are all expressed in the same unit, which can be a LL-PDU number, when LL-PDUs are of fixed size, as for example in HiperLAN/2, or a number of bytes as in TCP.

This unit is also used to define the sequence number space used to identify each LL-PDU. The sequence number range is determined so that no ambiguity arises in LL-PDU numbering and each LL-PDU can be uniquely identified. BoW and ToW are then sequence numbers of the LL-PDUs respectively located at the bottom and at the top of the sliding window. In the following for the sake of better understanding, an LL-PDU sequence number and the corresponding LL-PDU are considered to be equivalent.

BoW refers to the missing or corrupted LL-PDU of the lowest sequence number which is detected by the receiver, and ToW is determined from BoW by the following equation:

$$ToW = BoW + WS - 1$$

The transmitter can transmit or retransmit any LL-PDU comprised between BoW and ToW included.

BoW is updated by the receiver and advertised to the transmitter in the ARQ-ACK messages. When the size of the sliding window is variable, WS is also generally advertised in the ARQ-ACK messages, whereas when this size is fixed, WS is selected upon data link establishment.

Commonly, the Round Trip Time (RTT) of a data link is defined as the time elapsed between the emission of an LL-PDU and the reception of the corresponding ARQ-ACK message, i.e. an ARQ-ACK message covering the emitted LL-PDU, by the transmitter. RTT includes transmission delays due to the physical medium and processing in the various intermediate nodes, as well as processing in the transmitter and in the receiver.

This type of protocols is correctly adapted to data links where transmission errors occur. Conversely, a data link without any transmission errors may be impacted by such a protocol.

Actually, when no transmission error occurs, the maximum data link throughput, referred to as $B_{max}$, the corresponding RTT and WS are linked by the following equation:

$$B_{max}=WS/RTT$$

This relation can be deduced from the following simplification assumptions.

All transmitted LL-PDUs have the same size and the ARQ-ACK message transmission rate is not limited on the reverse data link, from the receiver to the transmitter. Stated otherwise, the reverse data link is transparent to the ARQ-ACKs.

Assuming that the transmitter emits LL-PDUs at a constant throughput B, time gap between LL-PDUs can be referred to as T. The receiver emits one ARQ-ACK per received LL-PDU. If the first LL-PDU ever sent by the transmitter is considered as the BoW, the ARQ-ACK message acknowledging this LL-PDU is received after the RTT. The sliding window allows the transmitter to further transmit a given number n of other LL-PDUs until the first ARQ-ACK is received, n being an integer lower than WS. The following equation is deduced:

$$n=B \times RTT$$

The received ARQ-ACK message gives the transmitter the opportunity to send one more LL-PDU. Stated otherwise, the BoW and consequently the sliding window progress. The subsequent ARQ-ACK messages are received every T, thus allowing a new LL-PDU to be sent every T, and therefore the transmitter continues emitting LL-PDUs at a throughput which equals B.

Thus, in order to achieve the throughput B, a minimum value of WS has to be chosen so as to verify the following relation:

$$WS_{min}=B \times RTT$$

FIG. 1 illustrates a transmitter 11, a receiver 12 and a given data link 13. The data link 13 transports a data flow at a bit rate referred to as B. A corresponding reverse data link 14 allows transmission of ARQ-ACK messages from the receiver 12 to the transmitter 11. On the transmitter side, a queue of LL-PDUs pending for transmission, referenced 16, comprises the LL-PDUs from LL-PDU#11 to LL-PDU#14. The previous LL-PDUs, from LL-PDU#1 to LL-PDU#10, have already been sent. Further, it assumes that the LL-PDUs from LL-PDU#1 to LL-PDU#7 have been received on the receiver side and that they are stored in a memory buffer referenced 15 until the receiver has sent their corresponding ARQ-ACK messages. As the receiver spends some time in LL-PDU and ARQ-ACK message processing, it is considering in the example shown that only the ARQ-ACK messages corresponding to the LL-PDUs from LL-PDU#1 to LL-PDU#3 have been processed and sent over the reverse data link 14. An ARQ-ACK message, corresponding to a LL-PDU emitted at time t, is received at time t+RTT on the transmitter side. It results therefrom that the memory buffer 15 must be able to store the number of LL-PDUs received during a time of RTT at most. In the example illustrated in FIG. 1, when the data flow is transmitted at a given bit rate B, during the time of RTT, the receiver stores 7 LL-PDUs.

In case of an error-prone transmission, a great part of the RTT can be spent in LL-PDU and ARQ-ACK processing in the receiver. It results therefrom that the receiver is provided with enough memory to store the LL-PDU transmitted during that time. Indeed, LL-PDUs are retransmitted upon reception of ARQ-ACKs indicating incorrectly received LL-PDUs. Apparent RTT becomes longer due to the time elapsed to obtain the retransmitted LL-PDU status through further ARQ-ACK messages. It is then preferable not to block the transmission of the transmitter while waiting for the ARQ-ACK messages. It results therefrom that a larger sliding window is preferably provided to compensate as much as possible for the latency due to retransmissions. Consequently, a large space of memory resource shall be reserved for some data links which exhibit stringent QoS constraints so that these constraints can be guaranteed even when these data links experience errors.

Regarding the previous description, either ARQ protocols are based on memory reservation and then a given throughput is guaranteed or they are based on a usage of memory without any reservation and then no throughput is guaranteed.

It results therefrom that it is difficult to apply an efficient dynamic ARQ windows management on different data links having different QoS and having different sliding window size requirements, particularly since these sliding window size requests are variable as a function of transmission errors notably.

SUMMARY OF THE INVENTION

Memory buffer used to implement a sliding window for a given data link is generally a limited resource taken in a shared memory resource between all the data links ending in the same receiver. Some applications have specific throughput requirements that have to be fulfilled by the underlying data link. It is then desirable to manage the sliding windows memory buffer to accommodate as well as possible all data links that share that common resource. In view of the foregoing, there is a need for a dynamic ARQ windows management adaptable to many types of applications having different QoS constraints.

In a first aspect, the invention thus proposes method of dynamic ARQ windows management in a network comprising:

at least one transmitter managing a plurality of different data links, or a plurality of transmitters each managing at least one data link, the transmitter or transmitters sending sliding window memory requests, the data links transporting PDUs according to an ARQ protocol and being associated to a respective QoS priority belonging to a set of predetermined QoS priorities;

at least one receiver for receiving a plurality of the data links and acknowledging each transmitted PDU by sending an ARQ acknowledgement or ARQ-ACK message to the transmitter;

a memory shared among the data links, which is comprised in the receiver for storing received PDUs, at least until they are acknowledged;

an ARQ management entity comprising a transmitter ARQ instance and a receiver ARQ instance for receiving the sliding window memory requests from the transmitter or transmitters, and for controlling each of the data links according to an operational control mode selected out of a predetermined set of operational control modes;

the method comprising the step of:

the ARQ management entity selecting a given operational control mode;

the transmitter or at least one of the transmitters sending one or more PDUs of a given data link to the receiver;

the receiver storing the received PDUs in the shared memory;

the receiver ARQ instance sending back the corresponding ARQ-ACK message including a specific information comprising the selected operational control mode and/or a flow control data, the receiver ARQ instance removing acknowledged PDUs from the shared memory when delivering them to an upper layer;

upon reception of the ARQ-ACK message, the transmitter ARQ instance continuing or stopping PDUs transmission on the data link, based on the specific information comprised in the ARQ-ACK message;

wherein the step of selecting the operational control mode is repeated dynamically on a per data link basis during PDUs transmission, while taking into account the available memory space within the shared memory, the respective associated QoS priority and the sliding window memory requests received from the transmitters by the receiver A second aspect of the invention relates to a device for controlling data flow transmission comprising means for carrying out the method according to the first aspect.

BRIEF DESCRIPTION OF THE DRAWINGS

Further features and advantages of the present invention will become more apparent from the description below. The latter is given purely by way of illustration and should be read in conjunction with the appended drawings, of which.

DESCRIPTION OF PREFERRED EMBODIMENTS

Figure 1:
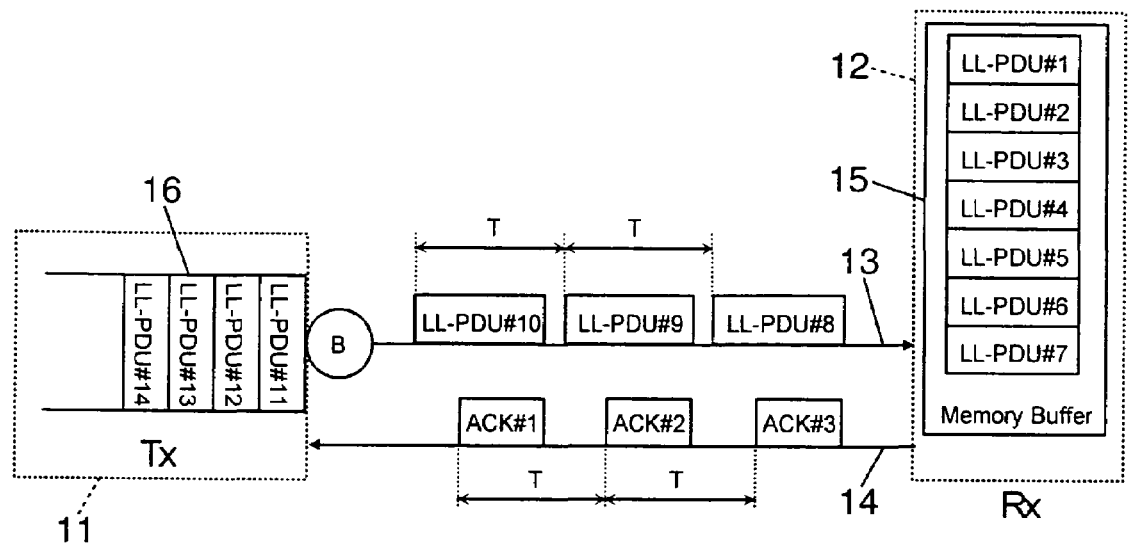
FIG. 1 illustrates a classical ARQ scheme according to the prior art.

One embodiment of the present invention proposes a method of ARQ windows management which defines a predetermined set of operational control modes and applies one of the operational control modes according to some specific characteristics. These characteristics can be the QoS constraints of a given application.

A transmitter and a receiver are linked by a set of data links. Each data link has transmission characteristics corresponding to a given level of QoS offered to the served applications of which PDUs are transported over that data link. These transmission characteristics can correspond to classes of traffic. The IEEE 802.1D standard proposes a classification that is exposed herein below.

| user_priority | Acronym | Traffic type |
|---|---|---|
| 1 | BK | Background |
| 2 | — | Spare |
| 0 (Default) | BE | Best Effort |
| 3 | EE | Excellent Effort |
| 4 | CL | Controlled Load |
| 5 | VI | "Video," < 100 ms latency and jitter |
| 6 | VO | "Voice," < 10 ms latency and jitter |
| 7 | NC | Network Control |

The traffic classes exposed herein above and which are equivalent to QoS levels can be used, for example, to associate a QoS level to data flows managed by one embodiment of the present invention.

A data flow corresponding to a given application transmitted from the transmitter to the receiver is mapped onto the data link whose class corresponds to the traffic requirements or QoS constraints of the given application. It is to be noted that an implementation of a proposed mechanism according to one embodiment of the present invention may rely on less or more traffic classes, which can be defined using other traffic characteristics or parameters. Classes will be identified as follows: $C_1, C_2, \ldots, C_n$, with $C_1$ having lower priority than $C_2$, and so forth. A data link k belonging to class $C_n$ will be referred to as $DL_k(C_n)$.

The data links preferably offer a reliable data transfer thanks to an ARQ protocol. The ARQ protocol can be based on a sliding window mechanism which is well known by a person skilled in the art.

As it has already been described above, an ARQ protocol requires a buffer memory on the receiver side to make the receiver able to manage the ARQ protocol. The memory used to implement such an ARQ protocol on each data link in the receiver is shared between all the data links.

A dynamic ARQ window management according to one embodiment of the present invention is managed by an entity referred to as ARQ management entity. The ARQ entity comprises a receiver ARQ instance (ARQ-RX) on the receiver side and a transmitter ARQ instance (ARQ-TX) on the transmitter side. The ARQ-RX instance is located at the destination end of the data link which manages the ARQ window of the data link. A single ARQ Memory Buffer Manager (ARQ-MBM) is in charge of managing the available memory buffer on the receiver side. It is invoked by the ARQ-RX instance. The ARQ-TX instance is located at the source end of the data link and triggers the requests of memory reservation for management of a sliding window based on traffic requirements.

In one embodiment of the present invention, for the sake of better understanding the predetermined set of operational control modes comprises two operational control modes. Of course, the invention encompasses an embodiment based on more operational control modes.

The ARQ entity performs a selection of one of the operational control modes on a per data link basis. A first selection is performed at the time of a data link establishment. Such a selection can be preferably performed at any time during the data transmission of a given data link. A first operational control mode will be referred to as Binary Flow Control (BFC). The second operational control mode will be referred to as Window Flow Control (WFC).

When the ARQ entity selects the BFC mode for a given data link, the ARQ-TX instance is preferably flow controlled using a flag in the ARQ-ACK messages. This flow control flag is referred to as S/R for Stop/Resume. Actually, this flow control flag comprises a flow control data to inform the transmitter about the fact that it has to stop or can continue (or Resume) the data transmission. In BFC mode, the receiver sets this flag based on the comparison between a threshold value and the available memory space, the threshold value being administratively set. When the available memory space is greater than the threshold value, the ARQ-RX instance set the flag to R for Resume and then the transmitter is allowed to continue the transmission corresponding to the given data link. Conversely, the ARQ-RX instance sets the flag to S for stop and the transmitter stops the respective data transmission.

When the ARQ entity selects the WFC mode for a given data link, an ARQ Window Size (ARQ-WS) is fixed through a window reservation mechanism based on a memory reservation mechanism. ARQ-WS is a parameter used by both ARQ-TX instance and ARQ-RX instance. The Flow Control mechanism introduced in the BFC mode is reproduced in the WFC mode so that the transmitter can temporarily exceed the negotiated ARQ-WS.

The memory reservation mechanism is preferably implemented through simple reservation messages that are added to the ARQ protocol message set. Of course, the present invention encompasses different protocol implementations. Two types of messages are defined: Window ReSerVation (ARQ-WRSV) message and Window GraNT (ARQ-WGNT) message. They can be transported in specific signalling LL-PDUs of the data link or integrated in already existing messages such as Requests for FeedBack (ARQ-RFB) and ARQ-ACK message. In that latter case, additional fields are preferably provided in the ARQ-RFB and ARQ-ACK messages. The ARQ-WRSV message includes information about the requested space of memory which is referred to as a Requested Window Size (ReqWS) field. The ARQ-WGNT message includes information about the reserved memory space which is really reserved in the shared memory of the receiver and which is referred to as a Granted Window Size (GntWS) field. Of course, the reserved memory space can be different from the requested memory space.

Such a protocol also preferably uses a flow control flag that is piggy-backed in the ARQ-ACK messages. When the flow control flag is set to R, the ARQ-ACK message also preferably contains a sequence number of the last correctly received LL-PDU (LastRx). This information is provided so that the ARQ-TX can determine the LL-PDU from which it can resume the data transmission. In addition, the current selected operational control mode (BFC or WFC) is indicated by the ARQ-RX instance, preferably included in each ARQ-ACK message in order to use an existing ARQ protocol message, through a flag which is referred to as a mode flag.

The ARQ Memory Buffer Manager (ARQ-MBM) is in charge of sharing the receiver shared memory between all ARQ-RX instances of data links ending in a given receiver. It maintains a table, referred to as ARQ-Table, of which each entry contains status information of one data link, as shown below. Such a table contains a Data Link Id field, a Class field, a Mode field and Window Size field.

| Data Link ID | Class | Mode | Window Size |
| --- | --- | --- | --- |

Data Link ID is the identifier attached to the Data Link i ($DL_i$).

Class is the priority class of $DL_i$.

Mode is the current operational mode of $DL_i$ ($Mode_i$)

Window Size if the currently reserved window size of $DL_i$ ($WS_i$).

To perform sharing of the memory according to the memory reservation requests corresponding to all data links, the ARQ-MBM takes as input the ReqWS field as passed by the ARQ-TX instance through the ARQ-WRSV message and the contents of the different table entries.

The following algorithm for sharing memory can be implemented in the ARQ-MBM:

BMSize: Total buffer memory size

BMRsv: Space of buffer memory occupied by all reserved windows $BMRsv(CL_i)$: Portion of buffer memory occupied by the reserved windows of class i data links $DL_i$: data link i $Mode_i$: Current data link operation mode of data link i $WS_i$: currently reserved window size of data link i (equals zero when in BFC mode)

$ReqWS_i$: Window size requested for data link i $GntWS_i$: Window size granted by the receiver for data link i Upon reception of an ARQ-WRSV message on $DL_i$:

$$BMRsv = \sum_i Ws_i$$

```
if (ReqWS_i ≤ WS_i)
    if (ReqWS_i = 0)
        Mode_i = BFC
    "reservation accepted"
    GntWS_i = ReqWS_i
    WS_i = GntWS_i
else
    if (ReqWS_i < (BMSize − BMRsv))
        if (WS_i = 0)
            Mode_i = WFC
        endif
        "reservation accepted"
        GntWS_i = Req WS_i
        WS_i = GntWS_i
    else
```

$$\text{if } \sum_{j<i} BMRsv(CL_j) \geq ReqWS_i$$

```
        if (WS_i = 0)
            Mode_i = WFC
        endif
        "reservation accepted"
        GntWS_i = ReqWS_i
        WS_i = GntWS_i
        force BEG mode for all DL_n of class j < i such as
```

$$\sum_n WS_n \geq ReqWS_i, \text{ that is,}$$

set the Mode field to BEG in the table for the corresponding Data Link.
```
        else
            "reservation denied"
            GntWS_i = WS
        endif
    endif
endif
```

At any time, the ARQ-MBM monitors the space of available buffer memory which can be calculated according to the following equation:

(BMSize−BMRsv).

Figure 2:
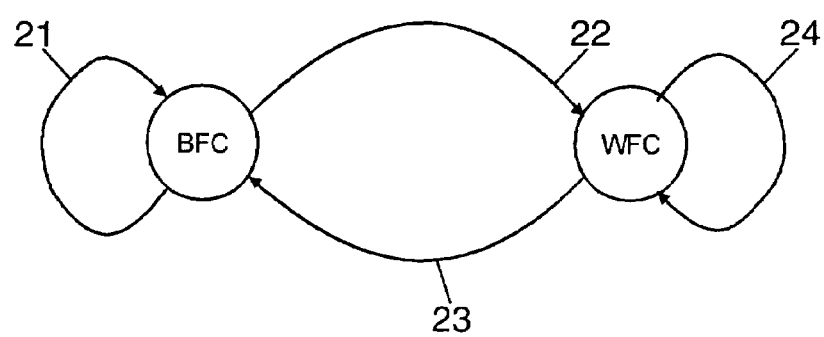
FIG. 2 illustrates a state machine between two operational control modes according to one embodiment of the invention.

FIG. 2 illustrates a state machine presenting the transitions between the BFC and the WFC modes. These transitions are triggered upon transmission (for the ARQ-RX instance), respectively reception (for the ARQ-TX instance), of an ARQ-WGNT or ARQ-ACK messages. Actually, the ARQ entity manages a transition referenced 22 from the BFC operational control mode to the WFC operational control mode when the receiver sends back, in response to an ARQ-WRSV comprising a requested memory space whose size is not equal zero, an ARQ-WGNT message to inform the transmitter that the memory reservation has been correctly performed. The ARQ entity manages a transition referenced 23 from the WFC operational control mode to the BFC operational control mode either upon reception of an ARQ-WRSV message comprising a requested memory space whose size is equal zero, or when the receiver is no longer able to guarantee the previously accepted memory reservation. In that case, the transition is triggered upon emission/reception of an ARQ-ACK message with the Mode field set to BFC. The transition referenced 24 illustrates the case where the transmitter requires a greater sliding window than the current one. In this case, the ARQ entity keeps the WFC operational control mode and only the reserved memory size is changed. On the other hand, the transition referenced 21 illustrates the case where the transmitter sends a ARQ-WRSV message to reserve a given memory space whose size is not equal zero and where the ARQ-RX instance is not able to accept this memory reservation. It results therefrom that the ARQ entity keeps the BFC mode.

The following section describes the operations performed on the receiver side by the ARQ-RX instance according to one embodiment of the invention.

Considering a given data link and whatever its operational mode is, upon reception of an LL-PDU, the ARQ-RX instance checks the available memory space in the shared memory buffer, which is calculated according to the following equation:

$$BMSize-BMRsv.$$

If the available memory space is lower than a given low threshold, the ARQ-RX instance sends an ARQ-ACK message with the flow control flag set to S, causing the ARQ-TX instance to stop the PDU transmission for the corresponding data link. LL-PDUs received after the ARQ-RX instance has sent an ARQ-ACK message with the flow control flag set to S may be discarded if the receiver is out of memory buffer.

If the available memory space in the memory buffer is greater than a given high threshold and the ARQ-TX instance has stopped the LL-PDUs transmission on the corresponding data link, i.e. after a last ARQ-ACK has been sent with the flow control flag set to S, the ARQ-RX instance sends an ARQ-ACK message with the flow control flag set to R including a valid LastRx field, to indicate to the transmitter the last valid received PDU.

In every other case when the ARQ-RX sends an ARQ-ACK message, the flow control flag is set to R.

In any case, the ARQ-RX instance indicates the current data link operational control mode through the mode flag located in the ARQ-ACK. The mode flag is determined from the Mode field of the entry associated to the data link in the ARQ-Table.

Considering a Data Link operating in BFC mode, upon reception of an ARQ-WRSV message, the ARQ-RX instance invokes the ARQ-MBM with the requested window size indicated in the ReqWS field. If the ARQ-MBM returns a "reservation accepted" indication, the ARQ-RX instance sends an ARQ-WGNT message with GntWS field comprising the same value as the ReqWS field and the operational control mode of the corresponding data link switches from the BFC mode to the WFC mode. If the ARQ-MBM returns a "reservation denied" indication, the ARQ-RX instance sends an ARQ-WGNT message with GntWS field set to zero and the data link remains in the BFC mode.

Considering a given data link operating in WFC mode, upon reception of an ARQ-WRSV message, the ARQ-RX instance checks if the newly requested window size indicated in the ReqWS field can be accommodated with the available memory buffer space by invoking the ARQ-MBM. If the ARQ-MBM returns a "reservation accepted" indication, the ARQ-RX instance sends an ARQ-WGNT message with GntWS field comprising the same value as the ReqWS field. If the requested window size modification is denied, the ARQ-RX instance sends an ARQ-WGNT message with GntWS field set to the value previously in use. If GntWS field is set to zero, the ARQ entity switches to the BFC mode.

The following section describes the operations performed on the transmitter side by the ARQ-TX instance according to one embodiment of the invention.

Whatever the operational mode is, upon reception of an ARQ-ACK message with the flow control flag set to S, the ARQ-TX instance stops emitting new LL-PDUs on the given data link but can still retransmit erroneous LL-PDUs.

Upon reception of an ARQ-ACK message with the flow control flag set to R, the ARQ-TX can continue to emit new LL-PDUs on the given data link if not stopped beforehand. If this message is received when stopped, the ARQ-TX instance resumes new LL-PDU transmissions starting from the sequence number indicated in the LastRx field.

In one embodiment of the invention, considering a given data link operating in the BFC mode, the ARQ-TX instance can preferably trigger a window memory reservation procedure at any time when in the BFC mode, by transmitting an ARQ-WRSV message containing the requested window size in the ReqWS field. A timer is started while waiting for the reception of the corresponding ARQ-WGNT message. If the timer expires before the ARQ-WGNT message is received, the same ARQ-WRSV message can be repeated. Upon reception of the ARQ-WGNT message, the ARQ-TX instance checks the GntWS field of the latter. If the returned window size equals the requested value, the memory reservation is successful. If the returned value is different from the requested value, notably if the returned value is zero, the reservation has failed and the data link remains in the BFC mode.

Considering a given data link operating in the WFC mode, the window size is fixed to the value returned in the most recently received ARQ-WGNT message containing a non-zero value in the respective GntWS field.

The window size can be modified at any time upon request of the ARQ-TX instance by using the same procedure as in the BFC mode.

Upon reception of a ARQ-WGNT message, the ARQ-TX instance updates the window size with the returned GntWS field value. If GntWS field equals zero, the data link mode switches to the BFC mode.

Upon reception of an ARQ-ACK message with the operational control mode flag set to the BFC mode, the data link mode switches to the BFC mode.

As mentioned before, the control flow flag set to S is interpreted as in the BFC mode. This last feature allows the ARQ-TX instance to overrun the negotiated window size when memory buffer resource is available in the receiver.

Figure 3:
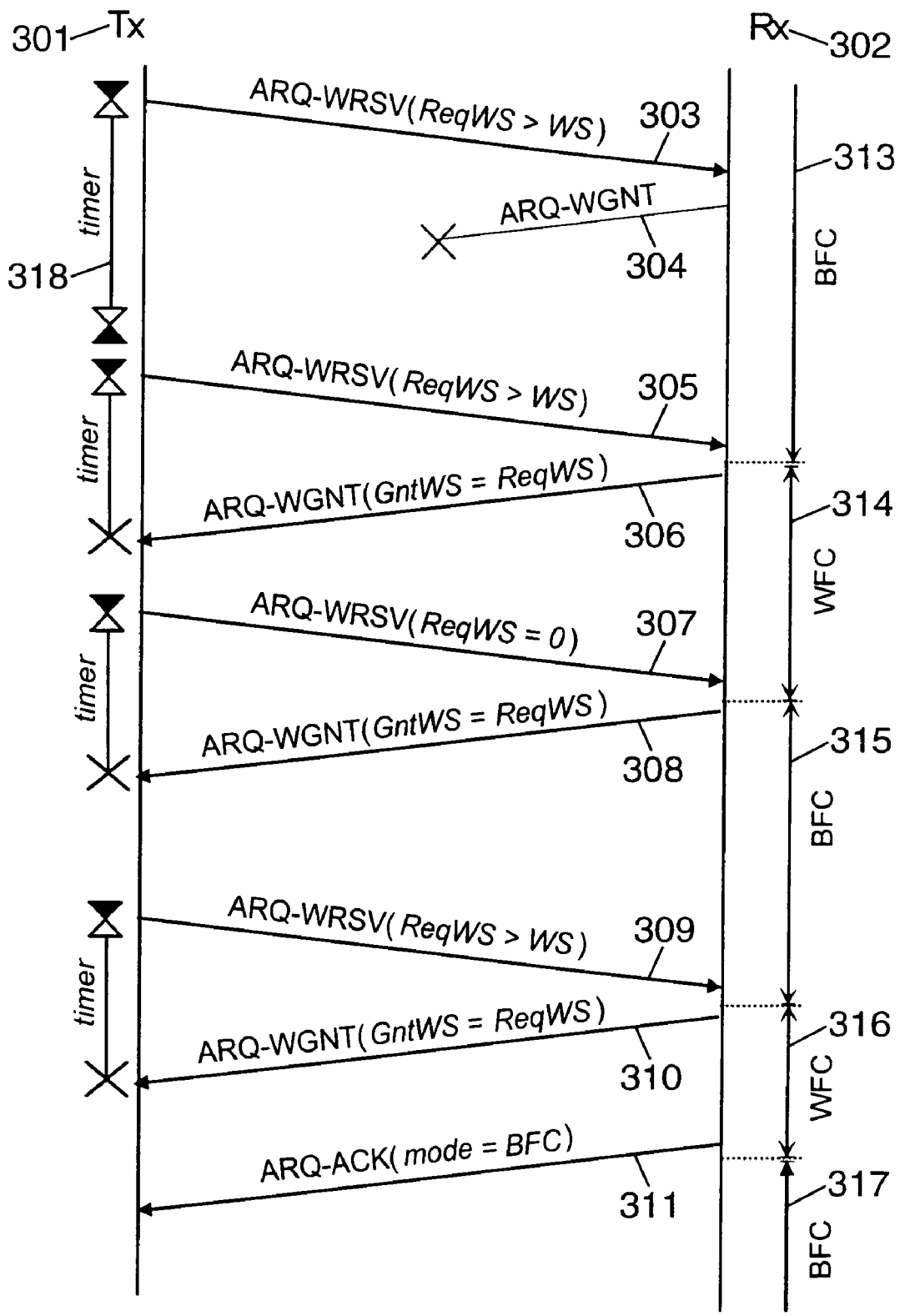
FIG. 3 illustrates exchanged messages between a transmitter and a receiver according to one embodiment of the invention.

FIG. 3 illustrates some cases of switching between the BFC mode and the WFC mode for a given data link on a given data link via exchanged messages in one embodiment of the present invention. Initially, the ARQ entity has selected the BFC mode 313. It results therefrom that no memory space is reserved on the receiver side for the given data link. The transmitter 301 sends an ARQ-WRSV message 303 to the receiver 302 to reserve a memory space and simultaneously starts a timer 318. The size of the requested memory space is set in the ReqWS field of the ARQ-WRSV message. The receiver 302 sends back to the transmitter 301 a ARQ-WGNT message 304. The transmitter 301 does not receive the latter before the timer expiration. The transmitter 301 repeats the same ARQ-WRSV message 305. As the available space of memory is greater than the memory space requested for reservation, the receiver 302 sends back to the transmitter a ARQ-WRSV message 306 accepting the memory reservation. The ARQ entity switches to the WFC mode 314 for the given data link. In order to release the reserved resource, the transmitter 301 sends an ARQ-WRSV message 307 comprising a requested memory size of zero. Upon reception of this message 307, the receiver releases the corresponding memory space and sends back to the transmitter 301 an ARQ-WGNT message 308. The ARQ entity switches to the BFC mode 315. Latter on, the transmitter 301 requires a memory reservation procedure by sending an ARQ-WRSV message 309 comprising a memory space size in the ReqWS field. The receiver accepts this reservation by sending back an ARQ-WGNT message 310 comprising the reserved memory space size which is equal to the requested memory space size. The ARQ entity switches to the WFC mode 316. Latter on, the receiver pre empts the memory space reserved to the given data link and then sends an ARQ-ACK message 311 comprising the mode flag set to BFC. Consequently, the ARQ entity switches to the BFC mode 317.

One embodiment of the present invention can be advantageously applied to a network where different application data flows presenting various QoS constraints are transmitted. Notably, a great flexibility is offered to application data flows without any particular QoS requirements. Actually, this type of application can advantageously use memory resource depending on their instant throughput, without having to use fixed size of reserved memory. Consequently, the memory buffer distribution between the data links can be dynamically performed. On the other hand, the application data flows with stringent QoS constraints are guaranteed resources by using the reservation procedures. Moreover, every application data flow can instantly reach the maximum throughput offered by lower layer as soon as there is enough memory buffer in the receiver. It results therefrom that the transmission efficiency is improved by a dynamic flexible and efficient memory management which uses the memory resource as long as it is available and which avoids to waste memory resource.

The invention claimed is:

1. A method of dynamic ARQ windows management in a network, the method comprising:
    selecting an operational control mode by an ARQ management entity comprising a transmitter ARQ instance and a receiver ARQ instance configured to receive sliding window memory requests from at least one transmitter, and to control, according to the operational control mode selected out of a predetermined set of operational control modes, each of a plurality of data links which are managed by said at least one transmitter, said data links being configured to transport PDUs according to an ARQ protocol and being associated to a respective QoS priority belonging to a set of predetermined QoS priorities;
    sending one or more PDUs of a given one of said data links to a receiver by the at least one transmitter;
    storing received PDUs in a shared memory, in said receiver, shared among said data links, and configured to store the received PDUs, at least until they are acknowledged;
    sending back, by said receiver ARQ instance, a corresponding ARQ-ACK message including specific information comprising said selected operational control mode and/or flow control data;
    removing acknowledged PDUs from said shared memory, by said receiver ARQ instance, when delivering the corresponding ARQ-ACK message to an upper layer;
    continuing or stopping PDUs transmission on a respective one of said data links upon reception of said ARQ-ACK message, by said transmitter ARQ instance, based on said specific information comprised in said ARQ-ACK message,
    wherein the step of selecting the operational control mode is repeated dynamically on a per data link basis during the PDUs transmission, while taking into account the available memory space within said shared memory, said respective associated QoS priority and the sliding window memory requests received from said at least one transmitter by said receiver; and
    wherein continuing or stopping the PDUs transmission on the respective one of the plurality of data links upon reception of said ARQ-ACK message, by said transmitter ARQ instance, is based on the selected operational control mode and the flow control data of said specific information comprised in said ARQ-ACK message,
    wherein the selected operational control mode is selected out of the predetermined set of operational control modes including a binary flow control mode and a window flow control mode.

2. The method of claim 1, wherein the set of predetermined operational control modes comprises at least a first operational control mode in which no memory space is reserved in the shared memory for a given data link and a second operational control mode in which a given memory space is reserved in said shared memory for the given data link exclusively.

3. The method of claim 2, wherein the second operational control mode is based on a sliding window mechanism.

4. The method of claim 2, wherein the flow control data is provided based on the following steps:
    if the available memory space in the shared memory is greater than a first threshold value set administratively, the flow control data advertises the respective transmitter ARQ instance to continue transmission of PDUs in respect of the data link; and
    otherwise, the flow control data advertises the respective transmitter ARQ instance to stop transmission of PDUs in respect of the data link.

5. The method of claim 4, further comprising the following step after the step of stopping transmission of PDUs:
    if the available memory space in the shared memory is greater than a second threshold value set administratively, the receiver ARQ instance advertises the transmitter ARQ instance to continue transmission of PDUs by sending a message including information about the last correctly received PDU; and
    the transmitter ARQ instance continues transmission of PDUs based on said information.

6. The method of claim 2, wherein the ARQ management entity switches the operational control mode from the first operational control mode to the second operational control mode when a memory reservation is performed according to the following steps of:
    the transmitter ARQ instance sending a memory reservation request message comprising a requested memory space in the shared memory for the given data link; and
    the receiver ARQ instance sending back a corresponding response message comprising memory information about a reserved memory space in the shared memory for said given data link;
    wherein the receiver ARQ instance determines said reserved memory space as a function of said requested memory space, of the respective QoS priority of said given data link and of the available memory space in the shared memory.

7. The method of claim 6, wherein, when no memory space is available in the shared memory, the receiver ARQ instance sends back a corresponding response message to refuse said memory reservation request, said response message comprising information about currently reserved memory space.

8. The method of claim 6, wherein the transmitter ARQ instance requests to change a size of the reserved memory space by further sending a memory reservation request defining a new requested memory space in the shared memory.

9. The method of claim 6, wherein, when the available memory space is not sufficient to achieve the memory reservation:
   the receiver ARQ instance groups the memory spaces reserved for low QoS data links which are associated to a QoS priority lower than that of said given data link; and
   if said grouped memory spaces are greater than the requested memory space, the receiver ARQ instance reserves the requested memory space to the given data link by pre empting memory spaces reserved for said low QoS data links; and forces said low QoS data links to switch from the second operational control mode to the first operational control mode;
   otherwise, the receiver ARQ instance sends back a corresponding response message to refuse said memory reservation comprising information about currently reserved memory space.

10. The method of claim 6, wherein the transmitter ARQ instance further performs the following steps:
   starting a timer when the memory reservation request message is sent;
   resetting said timer upon reception of the response message corresponding to said memory reservation request message; and
   sending again said memory reservation request message upon expiration of said timer.

11. The method of claim 6, wherein the ARQ management entity switches the operational control mode from the second operational control mode to the first operational control mode upon transmission for the receiver ARQ instance, respectively reception for the transmitter ARQ instance, of a response message, corresponding to a memory reservation request, comprising a reserved memory space which size equals zero or upon reception of an ARQ-ACK message comprising the first operational control mode.

12. The method of claim 2, wherein the first operational control mode is selected for data links associated to a comparatively lower QoS priority and the second operational control mode is selected for data links associated to a comparatively higher QoS priority.

13. The method of claim 1, wherein the receiver ARQ instance discards PDUs of a data link when no more memory space is available in the shared memory.

14. A device for controlling data link transmission, comprising:
   an ARQ management section configured to select an operational control mode, the ARQ management section comprising a transmitter ARQ section and a receiver ARQ section configured to receive sliding window memory requests from at least one transmitter and to control, according to the operational control mode selected out of a predetermined set of operational control modes, each of a plurality of data links which are managed by said at least one transmitter, said data links being configured to transport PDUs according to an ARQ protocol and being associated to a respective QoS priority belonging to a set of predetermined QoS priorities;
   the at least one transmitter configured to send one or more PDUs of a given one of said data links to a receiver;
   a shared memory, in said receiver, configured to store received PDUs, the shared memory being shared among said data links, and configured to store the received PDUs, at least until they are acknowledged;
   the receiver ARQ section configured to send back, a corresponding ARQ-ACK message including specific information comprising said selected operational control mode and/or flow control data, and to remove acknowledged PDUs from said shared memory when delivering the corresponding ARQ-ACK message to an user layer;
   said transmitter ARQ section configured to continue or stop PDUs transmission on a respective one of said data links upon reception of said ARQ-ACK message based on said specific information comprised in said ARQ-ACK message,
   wherein the ARQ management section is configured to select the operational control mode, repeated dynamically, on a per data link basis during the PDUs transmission, while taking into account the available memory space within said shared memory, said respective associated QoS priority and the sliding window memory requests received from said at least one transmitter by said receiver,
   the transmitter ARQ section is configured to continue or stop the PDUs transmission on the respective one of the plurality of data links upon reception of said ARQ-ACK message based on the selected operational control mode and the flow control data of said specific information comprised in said ARQ-ACK message, and
   the ARQ management section is configured to select the operational control mode out of the predetermined set of operational control modes including a binary flow control mode and a window flow control mode.

* * * * *